United States Patent
Li et al.

(10) Patent No.: US 9,607,077 B2
(45) Date of Patent: Mar. 28, 2017

(54) METHOD OR SYSTEM FOR RECOMMENDING PERSONALIZED CONTENT

(75) Inventors: Wei Li, Beijing (CN); Xianyu Zhao, Beijing (CN); Peng Liu, Beijing (CN)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/496,163

(22) PCT Filed: Nov. 1, 2011

(86) PCT No.: PCT/CN2011/001843
§ 371 (c)(1),
(2), (4) Date: Mar. 14, 2012

(87) PCT Pub. No.: WO2013/063718
PCT Pub. Date: May 10, 2013

(65) Prior Publication Data
US 2014/0236943 A1    Aug. 21, 2014

(51) Int. Cl.
*G06F 7/04* (2006.01)
*G06F 17/30* (2006.01)

(52) U.S. Cl.
CPC .. *G06F 17/30684* (2013.01); *G06F 17/30522* (2013.01); *G06F 17/30554* (2013.01); *G06F 17/30699* (2013.01); *G06F 17/30867* (2013.01)

(58) Field of Classification Search
CPC ......... G06F 17/30864; G06F 17/30867; G06F 17/30554; G06F 17/30522; G06F 17/30029; G06F 17/30
USPC .... 707/999.003, 999.005, 999.102, 999.107, 707/600, 722, 732, 733, 736, 748, 769, 707/776
See application file for complete search history.

(56) References Cited

U.S. PATENT DOCUMENTS

| | | | | |
|---|---|---|---|---|
| 7,853,485 | B2 * | 12/2010 | Song | G06F 17/30702 705/26.1 |
| 8,615,442 | B1 * | 12/2013 | Kapur et al. | 705/26.1 |
| 8,996,629 | B1 * | 3/2015 | Datar | G06F 17/30041 709/206 |
| 2007/0112792 | A1 * | 5/2007 | Majumder | G06F 17/30867 |
| 2007/0118498 | A1 * | 5/2007 | Song | G06F 17/30702 |
| 2009/0234784 | A1 * | 9/2009 | Buriano | G06F 17/30035 706/12 |
| 2010/0125544 | A1 * | 5/2010 | Lee | H04N 7/17318 706/54 |
| 2010/0125585 | A1 * | 5/2010 | Chu | G06F 17/30687 707/748 |
| 2012/0272160 | A1 * | 10/2012 | Spivack | G06Q 10/10 715/752 |
| 2013/0046772 | A1 * | 2/2013 | Gu et al. | 707/751 |

FOREIGN PATENT DOCUMENTS

| CN | 101923545 B | * | 10/2012 | G06F 17/30 |
|---|---|---|---|---|
| KR | 20020007742 A | * | 1/2002 | G06F 17/60 |

OTHER PUBLICATIONS

Deerwester, S., et. al. "Indexing by Latent Semantic Analysis", Journal of American Society for Information Science, 41 (6), pp. 391-407, 1990.

(Continued)

*Primary Examiner* — Bruce Moser
(74) *Attorney, Agent, or Firm* — Berkeley Law & Technology Group, LLP

(57) ABSTRACT

Methods and systems are provided that may be utilized to recommend content to a user.

16 Claims, 4 Drawing Sheets

100

(56) References Cited

OTHER PUBLICATIONS

Hofmann, T., "Probabilistic Latent Semantic Indexing", SIGIR '99, Berkeley, CA, pp. 50-57, 1999.
Blei, D. et. al., "Latent Dirichlet Allocation", Journal of Machine Learning Research, vol. 3, pp. 993-1022, 2003.
Teh, Y., et. al., "Hierarchical Dirichlet Processes", Journal of American Statistical Association, 101. (476), pp. 1-30, 2005.
Dumais, Susan T., "Latent Semantic Indexing (LSI): TREC-3 Report", In Proc. TREC, 12 Pages, 1995.
Wei, X. and W. Bruce Croft, "LDA-Based Document Models for Ad-hoc Retrieval", SIGIR '06, Seattle, WA, 8 Pages, Aug. 6-11, 2006.
Goldberg, D., et. al., "Using Collaborative Filtering to Weave an Information Tapestry", Communications of the ACM, vol. 35, No. 12, pp. 1-10, Dec. 1992.
Linden, G., et. al., "Amazon.com Recommendations: Item-to-Item Collaborative Filtering", IEEE Internet Computing, vol. 7, pp. 76-80, Jan.-Feb. 2003.
Bennett, James and Stan Lanning, "The Netflix Prize", In KDD Cup and Workshop 2007, San Jose, CA, pp. 1-4, Aug. 12, 2007.
Agarwal, D. and Bee-Chung Chen, "Regression Based Latent Factor Models", In Proc. KDD '09, Paris, France, pp. 1-9, 2009.
Agarwal, D. and Bee-Chung Chen, "fLDA: Matrix Factorization Through Latent Dirichlet Allocation", WSDM '10, New York City, NY, pp. 1-10, Feb. 4-6, 2010.
Chu, Wei and Seung-Taek Park, "Personalized Recommendation on Dynamic Content Using Predictive Bilinear Models", WWW 2009, Madrid, Spain, pp. 691-700, Apr. 20-24, 2009.
Chu, Wei, et. al. "A Case Study of Behavior-driven Conjoint Analysis on Yahoo! Front Page Today Module", In Proc. KDD '09, Paris France, pp. 1-9, 2009.
Hofmann, Thomas, "Probabilistic Latent Semantic Analysis", In Proc. UAI'99, Stockholm, Sweden, pp. 1-8, 1999.
Jones, Karen Sparck, "A Statistical Interpretation of Term Specificity and its Application in Retrieval", Journal of Documentation, vol. 60, No. 5, 9 Pages, 2004.

\* cited by examiner

METHOD OR SYSTEM FOR RECOMMENDING PERSONALIZED CONTENT

CROSS-REFERENCE TO RELATED APPLICATION

This application claims priority to International Application No. PCT/CN2011/001843, entitled "Method or System for Recommending Personalized Content," which was filed on Nov. 1, 2011, assigned to the assignee of the currently claimed subject matter and herein incorporated by reference.

BACKGROUND

1. Field

The subject matter disclosed herein relates to a method or system for recommending personalized content.

2. Information

Some media networks, such as Internet media networks, may comprise a large number of registered users and links to media content, such as news articles. For example, the Yahoo!™ network comprises over half a billion users and quality media assets, such as those in the realm of news, sports and finance, to name just a few among different examples of media assets.

Media networks strive to encourage users to remain within a particular network or website, as such users may be valuable to various advertising entities. For example, the more users which view a particular financial section or website within a media network, the more valuable that financial section or website may become and the more money that potential advertisers may be willing to pay to advertise to such users. Accordingly, given a broad range of users and news articles or other media content available within a media network, a value of the media network may potentially be increased if relevant media content can be provided to such users to encourage such users to remain within the media network for an extended period of time. To this end, media networks are increasingly attempting to leverage information known about both users and media content itself to provide such users with recommendations for relevant media content.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
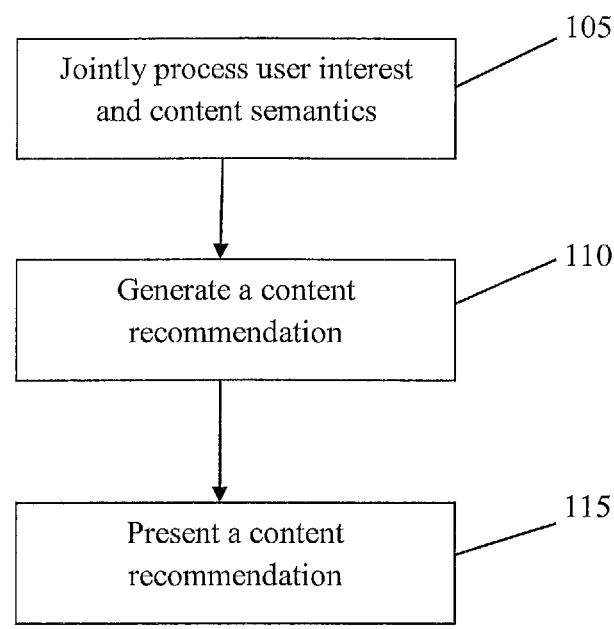
FIG. 1 is a flow diagram of a method for recommending content to a user according to an implementation.

Reference throughout this specification to "one example", "one feature", "an example", or "a feature" means that a particular feature, structure, or characteristic described in connection with the feature or example is included in at least one feature or example of claimed subject matter. Thus, appearances of the phrase "in one example", "an example", "in one feature" or "a feature" in various places throughout this specification are not necessarily all referring to the same feature or example. Furthermore, particular features, structures, or characteristics may be combined in one or more examples or features.

Media networks, such as the Yahoo!™ network, for example, are increasingly seeking ways to keep users within their networks. A media network may comprise an Internet website or group of websites having one or more sections, for example. For example, the Yahoo!™ network includes websites located within different categorized sections such as sports, finance, news, and games, to name just a few among possible non-limiting examples. A media network may comprise an Internet-based network or a non-Internet based network, for example.

The more users who remain within a media network for an extended period of time, the more valuable a network may become to potential advertisers and the more money advertisers may pay to advertise to users, for example. In an implementation, as discussed below, information known about users of a media network and media content available within a network may be leveraged to provide recommendations for relevant content to entice users to remain within a network for a relatively extended period of time. Recommendations to websites located outside of a media network may also be presented to users. For example, even if users are directed to websites outside of a particular media network, users may, in effect, remain loyal to the media network in the future if they believe that the media network provides links to highly relevant content.

According to one or implementations, as discussed herein, a system or method may be provided for determining or presenting recommendations for content for one or more users of a media network.

Based at least in part on mined interests of a user domain or a content domain, a personalized recommendation approach may be provided to predict users' responses to media content items, such as user selections or clicks. In other words, recommendations may be based on a likelihood or probability that a user will select or click on or otherwise become engaged in some way with one or more content items.

An approach may be utilized to predict user selection or click behavior for a group of users with respect to news-section story web pages, as an example. For example, recommendations for content may be determined based at least in part on a matching of users and news stories within a latent interest space.

Recommendations may be determined more efficiently or accurately than by using state of the art approaches to match users with news stories. Moreover, a personalized approach may be applied to various applications ranging from advertising to social media environments.

There are a number of content articles or web page pieces and users on the Internet, especially associated with content rich media networks. Content may be assessed or studied to determine relevant article or web pages to recommend to a particular user, for example. Conventional content topic analysis techniques may focus primarily on occurrences of keywords in content pieces to derive some latent semantic topic-based representations of content pieces, e.g., on a content or keyword facet. On the other hand, collaborative filter methods may be utilized to account for an interaction between user and content pieces, as discussed below.

"Latent interests," "latent variables," or "latent semantic topic-based representations" may refer to a one or more topics representative of a collection of content that may not be readily apparent from examining the face of the content. For example, various content items may be evaluated or processed to determine one or more associated latent interests. A probabilistic evaluation of content may be utilized to determine latent interests. If latent interests for a group of content items are known, a particular document not in the group may be compared against the group based at least in part on a comparison of associated latent interests, for example.

According to an implementation, as discussed herein, a joint modeling approach may be implemented to combine a content semantic approach and collaborative filtering. Reliable topics of content pieces may be deduced with few keywords by taking into account users' collaborative filtering effects on content pieces. A joint modeling approach may also address at least in part a cold start problem of conventional collaborative filtering approaches. A cold start problem may refer to an inability to recommend new content pieces for which no, or little information is known or available. A joint modeling approach may address a cold start problem by leveraging content semantic similarities in terms of keyword occurrences with content items. A joint modeling of content and usage signal information may be carried out, for example, in one embodiment via probabilistic factorization on a user behavior cube with respect to latent interests. Joint modeling may alleviate a sparseness problem in a user behavior cube.

A "user," as used herein may refer to an individual for which one or more characteristics are known or estimated, for example. A user may be registered within a particular media network, for example. A user may be identified based at least in part on an identifier, such as a user name, or cookies or other identifier associated with the user and which may be stored on the user's computer, for example. A user may be associated with a user profile which may associate the user with demographic or background information, location and age, user preferences, or other attributes, for example.

"Content," as used herein may refer to media content or one or more links to media content. Content may comprise one or more websites, text files, applications, audio files, video files, as well as other forms of content, for example.

Interaction between users of a media network, available content, and related information for users or content may be utilized to generate a representation of a user behavior cube. A "user behavior cube," as used herein, may refer to a multi-dimensional representation of a grouping of users, content, and information relating to the users or content. In one implementation, a user behavior cube may comprise a three-dimensional representation. A probabilistic interest mining method may be utilized to factorize a user behavior cubic representation within a maximum likelihood manner with respect to a certain number of latent interests common between users and network content.

"Factorization," as used herein, may refer to generating a model to represent a set of multiple variables or parameters. For example, if an extensive amount of signal or state information relating to users, content items, and related information is known, factorization may be utilized to generalize relationships between the users, content items, and related information.

Online interactions may be organized into a user behavior cube based at least in part on factors or criteria, such as user, content, keyword, or any combinations thereof, and content semantics and common latent interests may be jointly mined. A joint processing may characterize a relation between users and content pieces, and a relation between content and keywords concurrently.

However, as content pieces and users increase in numbers, processing may become computationally intractable to store and manipulate a cube to capture various facets of interaction among users, content pieces and keywords. Accordingly, a factorization of a cube with respect to at least some latent interests, may be implemented to derive tractable representations of content topics and user interests.

A joint modeling approach may leverage user actions to summarize content pieces as representative topics, which may be useful for content pieces with few or a limited number of keywords such as, for example, status updates, comments, short descriptions, and so forth. An approach may also leverage content similarities, in terms of keywords, to summarize user interests, to address a cold-start problem for items or improve a recommendation performance. Moreover, factorizing a cube with respect to at least some latent variables (e.g., interests), a system may derive low-dimensional tractable representations of users and content pieces within an interest space. A sparseness problem on a cube representation may therefore be at least partially alleviated. A user behavior cube may also account for evidence correlating users with content.

"Evidence," as used herein may refer to user or content-related features. Evidence may include demographical or other attributes of a particular user, such as the user's age, gender, or country of origin, to name just a few examples. Evidence may also include specific words or terms appearing in a particular content item. For example, evidence may include certain keywords contained within a news article web page.

FIG. 1 is a flow diagram 100 of a method for recommending content to a user according to an implementation. Embodiments in accordance with claimed subject matter may include all of, less than, or more than blocks 105-115. Also, the order of blocks 105-115 is merely an example order. At operation 105, user interest and content semantics may be jointly processed. User interest may be determined based at least in part on demographic information or user preferences for a user, for example. At operation 110, a content recommendation may be generated for a user. A content recommendation may be determined based at least in part on a comparison of latent interests associated with a particular content item and user and latent interests associated with a group of content items in combination with user interest. At operation 115, a content recommendation may be presented to a user. For example, a content recommendation may be determined by a remote server and may be transmitted via one of more electronic signals of an electronic communications network. A user's computer may receive transmitted electronic signals and may present one or more recommendations to a user. For example, recommendations may be presented via one or more selectable links to various content items in a browser or other graphical user interface.

A media network's assets or competitive advantage may include, for example, large content areas or sections for categories such as news, sports, and finance. Users may be engaged within a network via interactions with one or more content elements. A media network's success may be at least partially dependent upon its ability to mine user and content interactions to obtain an understanding of user behavior and content characteristics. Aspects in these interaction processes may include identities of users, content elements on a media network and features relating to users and content elements.

A semantic analysis may focus on various aspects of an understanding of media content, such as categories of media content, subject matter relating to media content, an author of the media content, or other aspects of various embodiments. A latent semantic indexing ("LSI") process may factorize a term-document matrix of signal or state values with a singular value decomposition ("SVD") process to yield a representation of documents and terms in a low-dimensional semantic space, e.g., as discussed in "Indexing by latent semantic analysis", by Deerwester et al., Journal of American Society for Information Science, 41(6):391-407. Probabilistic latent semantic analysis ("PLSA") may be implemented, comprising an initial probabilistic extension of LSI, as discussed in "Probabilistic latent semantic indexing," by Hoffman, In Proc. UAI'99, Stockholm. Of course, claims are not limited to subject matter of this article.

Other processes may include Latent Dirichlet Allocation ("LDA"), as discussed in "Latent Dirichlet Allocation," by Blei et al., Journal of Machine Learning Research, vol. 3, pp. 993-1022, and Hierarchical Dirichlet Process ("HDP"), as discussed in "Hierarchical Dirichlet process," by Teh et al., Journal of American Statistical Association, 101 (476): 1566-1581. Various processes may provide a flexible probabilistic evaluation of contents with respect to a certain or uncertain number of latent topics. Approaches, such as example implementations, may address synonymy or polysemy problems in natural languages more effectively than a conventional vector space representation of documents and may achieve more effective information retrieval in at least some tasks.

One drawback, however, of content semantic analysis techniques, such as those as described herein, may include not considering user interaction with content items and not accounting for effects of user preferences on derived latent topics.

Collaborative filtering ("CF") was developed as an effective technique to uncover complex user behavior patterns, e.g., browsing preferences, item ratings, and so forth. CF has been adopted in various recommender systems and web advertising. However, conventional CF methods have a cold start problem. In other words, conventional CF methods may have difficulties handling new users and items on a network.

A general framework jointly conducting latent topic analysis and collaborative filtering may be generated to derive a set of tractable representations of users and contents elements on a user behavior cube. An approach may factorize a user behavior cube to find a set of latent interest variables to capture a trade-off between word co-occurrence across documents and users' collaborative information. A personalized recommendation approach may be designed to deliver related and personalized content or social feeds based at least in part on learned user interest profiles to address user response objectives. Examples of latent interests relating to a collection of content describing cable television programming may include "film," "music," or "sitcom" to name just a few among many different examples of latent interests.

A personalization recommendation application for a media network may improve click-through ratio ("CTR") prediction results of latent interest profiles relative to those possible with methods using user demographic features or keywords. An approach may be readily adapted to other personalization scenarios such as advertising and social networks. Additionally, representations of users and content elements on a latent interest space may be used as features to enhance other advanced recommendation models.

Figure 2:
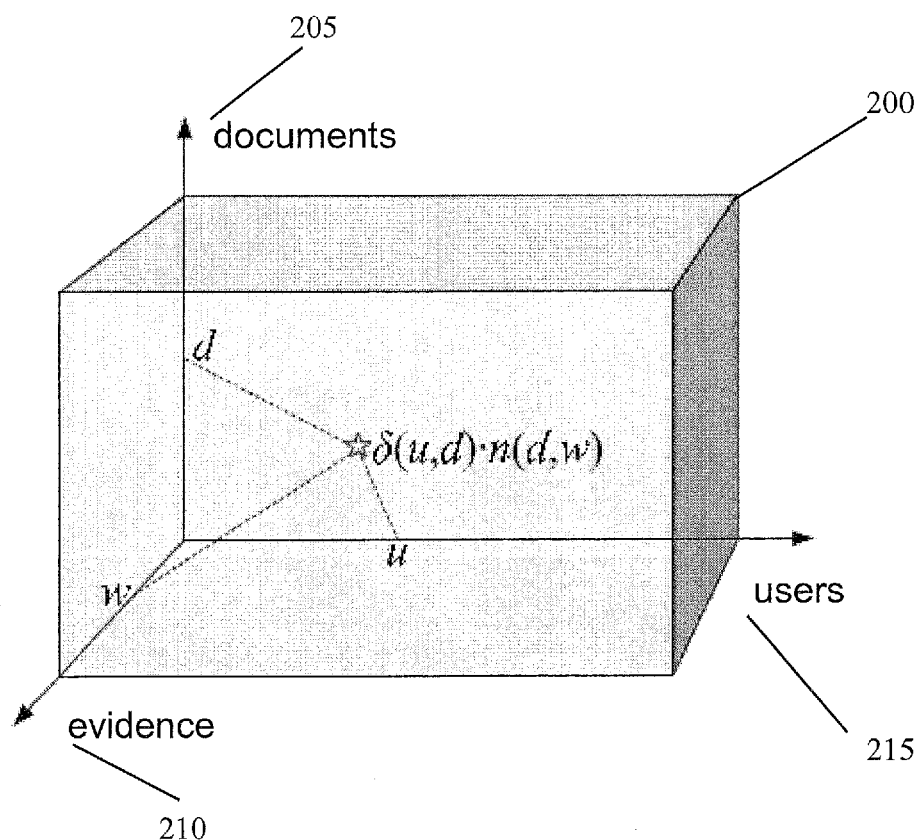
FIG. 2 illustrates a representation of a user behavior cube according to an implementation.

FIG. 2 illustrates a representation of a user behavior cube 200 according to an implementation. User behavior cube 200 in an implementation may illustrate axes for three variables, such as a content axis 205, an evidence axis 210, and a users axis 215, although claimed subject matter is not so limited. Various points on a surface of or within user behavior cube 200 may be represented with a triple, (u, d, w). User interactions on a media network may be represented by triple, (u, d, w), for example. For example, on a news section of a media network, triple (u, d, w), may indicate that a user u viewed a news content article or document d, and evidence w may indicate one or more a user- or document-related features. Evidence w may include demographical or other attributes of user u, such as age, gender, country, or income, to name just a few among many different possible examples of demographical or other attributes. Evidence w may also indicate one or more specific terms appearing in news article or document d.

Focusing on a facet of a document-term, a PLSA/LDA analysis may be performed to reach a content relation understanding of evidence w. From a user-document facet, user behavior patterns may be determined via collaborative filtering. Facets of user behavior cube 200 may be considered in combination to achieve an understanding of content as well as a user understanding.

A unified probabilistic framework may be utilized to mine user interests on a user behavior cube 200. A discussion as follows focuses on a case in which evidence w includes terms appearing in content or document d. In other embodiments, cube factorization may be extended to incorporate other forms of user/document related features, of course.

A user behavior cube learning process may be treated as a probabilistic factorization method working on user behavior cube 200. Joint probability of a user, content documents, and evidence may be factored with respect to a set of latent variables:

$$p(u, d, w) = \sum_i p(u, d, w \mid i) p(i) = \sum_i p(u \mid i) p(d \mid i) p(w \mid i) p(i) \quad [1]$$

where p(u, d, w) comprises a joint probability and i comprises a latent variable capturing an interaction between users, content documents and evidence.

A relation, $\Lambda=\{p(u|i),p(d|i),p(w|i),p(i)\}$, may collectively characterize observed parameters. An operational or functional relationship may therefore be indicated by:

$$\tilde{\Lambda} = \operatorname{argmax} \prod_{u,d,w} p(u, d, w)^{\delta(u,d) \cdot n(d,w)} \quad [2]$$

$$= \operatorname{argmax} \prod_{u,d,w} \sum_i \{p(u, d, w \mid i) p(i)\}^{\delta(u,d) \cdot n(d,w)}$$

where n(d, w) denotes how often term w occurs in content document d, and δ(u, d) comprises a signal or state value assessing user u's attention to document d. Signal or state value δ(u, d) may comprise a binary variable. Therefore, a value of "1", for example, indicates that user u views content document d; and a value of "0", for example, indicates that user u does not view content document d.

An Expectation-Maximization (EM) process may be applied to relation 2 shown above. A posteriori distribution of a latent interest variable may be calculated as:

$$p(i|u, d, w) = \frac{p(u|i)p(d|i)p(w|i)p(i)}{\sum_i p(u|i)p(d|i)p(w|i)p(i)} \quad [3]$$

Probabilities may be calculated as:

$$p^{new}(w|i) \propto \sum_{u,d} n(d, w)\delta(u, d)p(i|u, d, w) \quad [4a]$$

$$p^{new}(u|i) \propto \sum_{w,d} n(d, w)\delta(u, d)p(i|u, d, w) \quad [4b]$$

$$p^{new}(d|i) \propto \sum_{u,w} n(d, w)\delta(u, d)p(i|u, d, w) \quad [4c]$$

$$p^{new}(i) \propto \sum_{u,d,w} n(d, w)\delta(u, d)p(i|u, d, w) \quad [4d]$$

A user behavior cubic factorization may consider not only co-occurrences of documents and terms but also implicit grouping effects of browsing behavior of users. For example, a tuple (u, d, w) may capture multiple facets of co-occurrences. Pairs of (d, w) may, for example, characterize co-occurrences of document (d) and terms (w), which may be used to infer semantic information from literal terms in documents. Meanwhile, based at least in part on a user's reading interest, the user may intend to read to documents of certain characteristics; hence, when considering user browsing behavior, co-occurrences of user-document (d, u) pairs, for example, may provide other clues on how to group documents besides explicit terms in these documents. Accordingly, implicit grouping may therefore affect a user's browsing behavior. In a cubic factorization framework, for example, co-occurrences may be considered together to infer latent user interests and content semantics jointly that align not only with literal contents but also with users' browsing behavior.

A media network may reach hundreds of millions of users, potentially resulting in a large user behavior cube. To account for a large number of users, a distributed version of a cube factorization process may be utilized in at least one embodiment.

A distributed version of a user behavior cube may be implemented in at least one embodiment by decomposing user parameters p(u|i). For example, an objective function may be rewritten as:

$$p(u, d, w) = \sum_i p(d|i)p(w|i)p(u, i) \quad [5]$$

A joint distribution p(u, i) may be calculated for a given user u as:

$$p(i|u, d, w) = \frac{p(d|i)p(w|i)p(u, i)}{\sum_i p(d|i)p(w|i)p(u, i)} \quad [6a]$$

-continued $$p^{new}(u, i) = \frac{\sum_{w,d} n(d, w)\delta(u, d)p(i|u, d, w)}{\sum_{w,d} n(d, w)\delta(u, d)} \quad [6b]$$

In an embodiment, user parameters $p^{new}(u, i)$ may be updated during one or more iterations even if parameters associated with other users are unknown. Training signal samples δ(u, d), as well as p(u, i), may be decomposed as p(d|i),p(w|i), and n(d, w) may be stored in memory, for example.

A "map reduce" framework may process large sets of signal or state values on some distributable problems using a large number of computers (nodes). Computational processing may occur on signal or state values stored in a filesystem (unstructured) or within a database (structured), for example.

In a "map" operation, for example, a master node may partition an input into smaller sub-problems, and distribute those sub-problems to worker nodes. A worker node may also partition an input into smaller sub-problems, resulting in a multi-level tree structure. A worker node may process a smaller problem, and pass an answer back to a master node.

In a "reduce" operation, for example, a master node may process received answers to sub-problems and combine the answers in some way to acquire an answer to the problem the master node was initially attempting to solve.

User level signal samples may be sequentially collected, for example, and corresponding signal values for $p^{new}(u, i)$ may be updated and written back to a record in an external storage device in one embodiment. Likewise, signal values for p(i|u, d, w) may be acquired to update signal values for $p^{new}(d|i), p^{new}(w, i)$, and $p^{new}(i)$.

A distributed training procedure as discussed above may therefore be utilized to scale a user behavior cube to a tractable level. It should be noted that as a result of symmetry between u, d, and w, a training procedure may also be decomposed by d or w for additional computations savings.

In at least one implementation, however, a cubic factorization result for p(u|i) or p(d|i) may be too "heavy" to be agilely updated "on the fly," in light of emerging fresh users and articles or other information, for example. Therefore, in at least one embodiment, a "light" interest profile building mechanism may be implemented to handle historical and fresh users or articles in a consistent manner, based at least in part upon a factorization result.

Building a profile for a given user or article may be implemented in a manner analogous to an approach utilized for PLSA as discussed in "Probabilistic latent semantic indexing", by T. Hoffman, In Proc. SIGIR'99, for example. For example, according to PLSA approach, a corpus of documents may be evaluated to find a low-dimensional representation of the corpus. New documents may be added via a "folding in process." A "folding in" process may, for example, refer to an operation or process for adding documents or other information to a representation of a corpus. For example, a "folding in" process may add documents, which are not originally in a corpus of documents, and may project the documents into a lower-dimensional space.

For an article in a profile building stage, an interest profile may be determined based at least in part on keywords. For example, for a given document d, an optimization problem as follows may be solved:

$$\lambda_d^* = \text{argmax}_{\lambda_d} \prod_w \left\{ \sum_i p(d \mid i)\hat{p}(w \mid i)\hat{p}(i) \right\}^{n(d,w)} \quad [7]$$

where $\lambda_d = \{p(d|i)\}_i$ comprises parameters to be calculated and $p^*(w|i), p^*(i)$ may be trained during a factorization stage and may be fixed at this stage. Typically, a reliable estimation of d may be obtained after a small number of iterations, such as two iterations in an implementation, for example. A user dimension need not be considered in this operation. For example, there may not be any user actions known for a fresh document.

For a given user u, a similar approach, as follows, may be constructed:

$$\lambda_{ud}^* = \text{argmax}_{\lambda_d} \prod_{d,w} \left\{ \sum_i p(ud \mid i)p^*(d \mid i)\hat{p}(w \mid i)\hat{p}(i) \right\}^{\delta(u,d)\cdot n(d,w)} \quad [8]$$

where $\lambda_u = \{p(u|i)\}_i$ to be calculated, $\hat{p}(w|i)$ and $\hat{p}(i)$ are trained during a factorization stage, and $p^*(d|i)$ comprises a fold-in result obtained via [7] shown above.

If user relations are ignored in a user behavior cube, a factorization process may degenerate to a PLSA model. Factorized user or content document profiles may also be generated in a semantic space given by PLSA, and may be compared with a cubic factorization. On the other hand, if content of documents are ignored, a factorization process may degenerate into another case, which may be viewed essentially as a probabilistic version of collaborative filtering.

As compared to two degenerated cases discussed above, user behavior cubic factorization may jointly address, at least in part, content understanding and user understanding, which may be suitable, for example, for applications on a content-rich network which serves a large amount of users.

To facilitate various interest based recommendation applications, an approach may be formulated to employ measurable user responses, such as click through rate (CTRs), dwelling time, and so forth. User clicks may take a form of a binary value. For example, a logistic regression model may be applied to construct an objective function:

$$p(clk \mid u, d) = \frac{1}{Z} \exp\{\lambda_1^T f_1(u) + \lambda_2^T f_2(d) + \lambda_3^T f_3(u, d)\} \quad [9]$$

where $f_1(u)$ and $f_2(d)$ represent user and document feature vectors, respectively, and $f_3(u, d)$ denotes interaction features between a user and a content document, and Z comprises a normalization factor.

A cascaded training procedure may be designed to calculate feature weights in one implementation, for example, in two stages. In a first stage, feature vectors of $f_1(u)$ and $f_2(d)$ may be incorporated to train an "a priori" model. Some examples of features may include position, freshness, and user demographic features such as gender, age, and location, for example. An objective may be calculated as follows:

$$p(clk \mid u, d) = \frac{1}{Z} \exp\{\lambda_1^T f_1(u) + \lambda_2^T f_2(d)\} \quad [10]$$

An "a priori" clickability may be employed as a reference CTR. During a second stage, "a priori" clickability may be adopted to guide user-document interest co-occurrence features. Therefore, an objective during a second stage may be represented as:

$$p(clk \mid u, d) = \frac{\exp[\lambda_3^T f_3(u, d)]p_o(clk \mid u, d)}{\exp[\lambda_3^T f_3(u, d)]p_o(clk \mid u, d) + p_o(\overline{clk} \mid u, d)} \quad [11]$$

Information relating to users of a media network may be processed. For example, demographical information about users may be considered along with browsing and selection or click behaviors on news articles or other web pages within a media network. Information relating to users may be joined with detailed content grid feeds to generate a user behavior cube for training purposes.

An evaluation of content may determine latent interests. A mere PLSA approach may determine multinomial distributions. An illustrative explanation of a difference between results of latent topic and cubic interest analysis is shown below in Table 2. Table 2 illustrates top words from two multinomial distributions p(w|t) of PLSA as latent topics. As shown, a PLSA approach may tend to align underlying topics with a particular event granularity level. As shown, two topics are respectively "Oscar" and "Afghan."

On the other hand, top words of two corresponding latent interests based at least in part on the cubic factorization, e.g., p(w|i), are shown on the right-hand side of Table 2. As shown, a difference between latent topics and latent interests is that latent interests are more general than latent topics, but may capture an interest reasonably. Accordingly, latent interests may be labeled as "entertainment" and "terrorist." An "entertainment" latent interest, for example, may cover a combination of movie, music, camera and other entertainment items. Some latent interests may not frequently co-occur at an article level, but may instead be linked based at least in part on user level relations. A similar analysis may be made with respect to a "terrorist" interest shown in Table 2.

TABLE 1

Derived Latent Topics and Interests

| Latent topics | | Latent interests | |
|---|---|---|---|
| Oscar | Afghan | Entertainment | Terrorist |
| award | force | film | explosion |
| globe | kill | Jackson | Slovak |
| golden | Afghan | music | airport |
| drama | Nato | nominee | war |
| Oscar | Taliban | show | police |
| actor | civilian | Oscar | Dublin |
| nominee | troop | guild | CIA |
| honor | Attack | critic | bomber |
| film | Afghanistan | gadget | Irish |
| Disney | Kabul | actor | Afghanistan |
| comedy | wound | golden | passenger |
| broadway | police | album | luggage |
| avatar | soldier | star | ban |
| actress | bomb | camera | Ireland |
| cast | insurgent | song | terrorist |

Examples shown in Table 2 may intuitively show that a system may "learn" underlying user interests, as opposed to merely semantic topics, by factorizing a behavior cube. Hence, a system may take advantage of a learning result in personalized recommendation applications.

For example, recommendations may be made based at least in part on suggestions within a social net work context. Matching a user with another user may be technically similar to matching latent interests between a user and content. Usage may lead to an intuitive interest-based suggestion use case in a social network context, which may be useful for content-rich networks for which a user's interest may be summarized based at least in part on a known browsing history, for example.

A social network context may be tested based on matching media network users to social network information, such as feeds from a social application such as Twitter™ or some other application via which a user may post status updates. In this example, real user response information is unavailable, so evidence or features for a personalized recommendation model may be weighted equally, which may subsequently degenerate to a cosine similarity.

Figure 3:
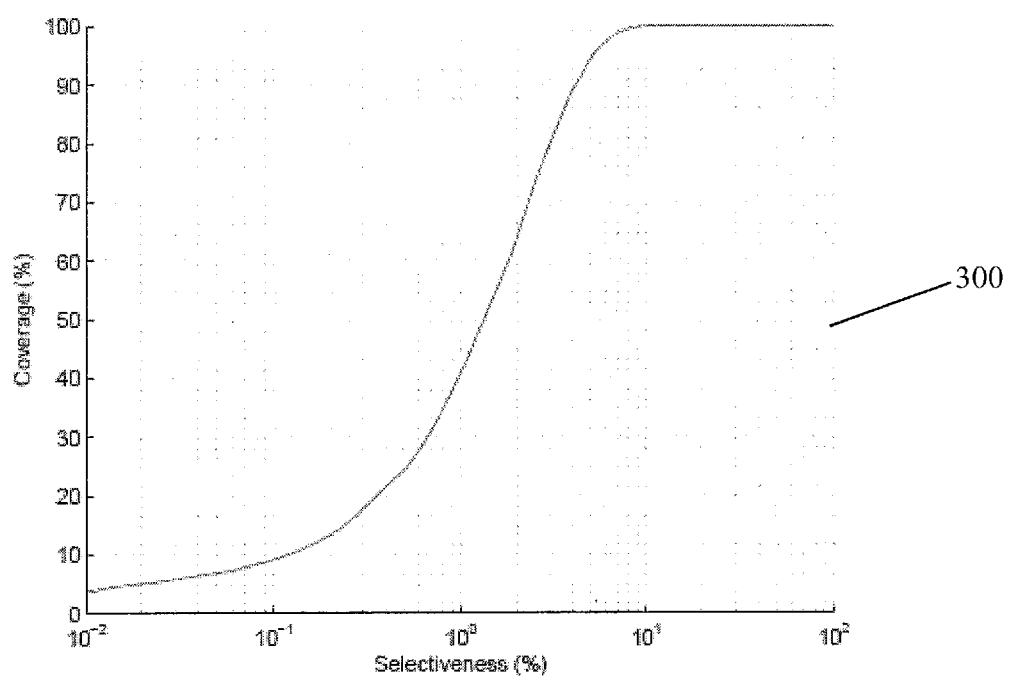
FIG. 3 is a chart illustrating selectiveness versus coverage based at least in part on a comparison of users relative to feeds for a social networking application.

For example, 100,000 users may be selected from a media network, and interest for users may be obtained and matched against 10,000 popular (e.g., with a largest number of followers) feeds on a social networking application. FIG. 3 is a chart 300 illustrating selectiveness versus coverage based at least in part on a comparison of users relative to feeds for a social networking application. In FIG. 3, an x-axis, selectiveness, may refer to percentage of feeds selected given some threshold on a matching cosine similarity. A y-axis, coverage, in this example illustrates a corresponding percentage of network users that may be matched with social network feeds given a particular selectiveness level.

FIG. 3 suggests that a balance may be achieved between recommendation quality (e.g., restricted "selectiveness") and comprehensiveness (e.g., sufficient "coverage") for matching within a latent interest space. Related feed suggestions for about 40% of media network users may be determined even if a number of recommended social network feeds is restricted to a threshold level of selectiveness <1%, for example, to obtain a defined recommendation quality.

Latent interest matching may also be performed within the context of online advertising. For example, interest features may be added as evidence for online advertising.

Figure 4:
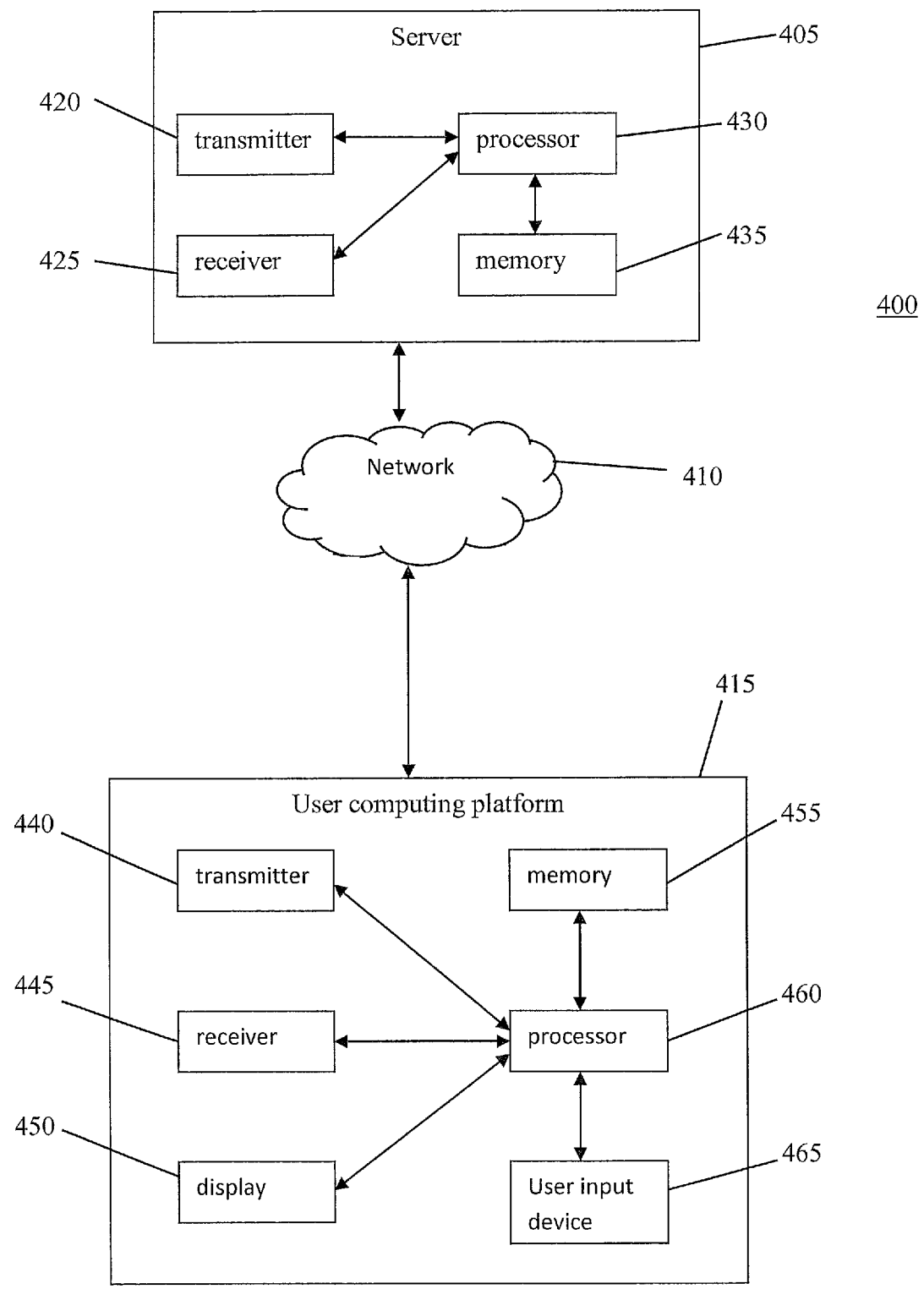
FIG. 4 is a schematic diagram illustrating a computing environment system that may include one or more devices able to display web browser information according to one implementation.

FIG. 4 is a schematic diagram of a system 400 that may include a server 405, a network 410, and a user computing platform 415. Server 405 may jointly process information about users and content to determine a user behavior cube and may determine content recommendations for a particular user based at least in part on the user behavior cube, as discussed above. Although only one server 405 is shown in FIG. 4, it should be appreciated that multiple servers may perform such joint processing. Server 405 may include a transmitter 420, receiver 425, processor 430, and memory 435.

In one or more implementations, a modem or other communication device capable of transmitting and receiving electronic signals may be utilized instead of or in addition to transmitter 420 and receiver 425. Transmitter 420 may transmit one or more electronic signals containing content recommendations to user computing platform 415 via network 410. Receiver 425 may receive one or more electronic signals which may contain information relating to users, content, or related evidence, for example.

Processor 430 may be representative of one or more circuits configurable to perform at least a portion of a data computing procedure or process. By way of example but not limitation, processor 430 may include one or more processors, controllers, microprocessors, microcontrollers, application specific integrated circuits, digital signal processors, programmable logic devices, field programmable gate arrays, and the like, or any combination thereof.

Memory 435 is representative of any data storage mechanism. Memory 435 may include, for example, a primary memory or a secondary memory. Memory 435 may include, for example, a random access memory, read only memory, or one or more data storage devices or systems, such as, for example, a disk drive, an optical disc drive, a tape drive, a solid state memory drive, to name just a few examples. Memory 435 may be utilized to store information relating to users, content, or related evidence, for example. Memory 435 may comprise a computer-readable medium that may carry and/or make accessible data, code and/or instructions executable by processor 430 or some other controller or processor capable of executing instructions, for example.

Network 410 may comprise one or more communication links, processes, and/or resources configurable to support the exchange of data between server 405 and user computing platform 415. By way of example but not limitation, network 410 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

User computing platform 415 may comprise one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

User computing platform 415 may include items such as transmitter 440, receiver 445, display 450, memory 455, processor 460, or user input device 465. In one or more implementations, a modem or other communication device capable of transmitting and receiving electronic signals may be utilized instead of or in addition to transmitter 440 and receiver 445. Transmitter 440 may transmit one or more electronic signals to server 405 via network 410. Receiver 445 may receive one or more electronic signals which may contain content recommendations, for example. Display 450 may comprise an output device capable of presenting a graphical user interface or displaying visual information, such as a computer monitor, cathode ray tube, LCD, plasma screen, and so forth.

Memory 455 may stored cookies relating to one or more users and may also comprise a computer-readable medium that may carry and/or make accessible data, code and/or instructions executable by processor 460 or some other controller or processor capable of executing instructions, for example. User input device 465 may comprise a computer mouse, stylus, track ball, keyboard, or any other device capable of receiving an input from a user.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method, comprising:
   jointly processing user interest and content semantics to summarize a particular item of content of a plurality of items of content as one or more topics based, at least in part on a combination of the user interest and the content semantics, wherein the user interest is based at least in part on a relationship between users and the particular item of content, and the content semantics is based at least in part on a relationship between the particular item of content and co-occurrence of keywords in the plurality of items of content, wherein the user interest for the particular item of content is determined based, at least in part, on an estimated selection rate of the particular item of content, the estimated selection rate being based, at least in part, on a freshness factorization feature of the particular item of content, the jointly processing further comprising:
   generating a user behavior cube to model a relationship between the users, the plurality of items of content, and the content semantics;
   factorizing the user behavior cube with respect to a combination of latent interests of the users and the content semantics to determine a correlation between at least the users and the plurality of items of content;
   generating a content recommendation for a particular user based at least in part on the determined correlation; and
   transmitting one or more electronic signals via an electronic communication network to a computing device, wherein the one or more electronic signals comprises the content recommendation.

2. The method of claim 1, wherein the content recommendation comprises a link to one or more items of media content.

3. The method of claim 1, further comprising generating the content recommendation at least partially in response to determining a user profile for the particular user.

4. The method of claim 1, further comprising generating the content recommendation for the particular user based at least in part on reference to the user behavior cube.

5. The method of claim 1, wherein the latent interests represent interactions between the users, the plurality of items of content, and the content semantics.

6. An apparatus, comprising:
   a receiver to receive one or more electronic signals from an electronic communication network; and
   a processor to initiate display of a content recommendation for a particular user, the content recommendation to be received via the one or more electronic signals and to be determined based at least in part on:
   joint processing of user interest and content semantics to summarize a particular item of content of a plurality of items of content as one or more topics based, at least in part on a combination of the user interest and the content semantics, wherein the user interest is to be based at least in part on a relationship between users and the particular item of content, and content semantics to be based at least in part on a relationship between the particular item of content and co-occurrence of keywords in the plurality of items of content, wherein the user interest for the particular item of content is to be determined based, at least in part, on an estimated selection rate of a particular item of content, the estimated selection rate to be based, at least in part, on a freshness factorization feature of the particular item of content, the joint processing further comprising:
   generation of a user behavior cube to model a relationship between the users, the plurality of items of content, and the content semantics;
   factorization of the user behavior cube with respect to a combination of latent interests of the users and the content semantics to determine a correlation between at least the users and the plurality of items of content;
   generation of the content recommendation for the particular user to be based at least in part on the determined correlation.

7. The apparatus of claim 6, the processor to initiate display of the content recommendation via a graphical user display.

8. The apparatus of claim 6, the content recommendation to comprise a link to one or more items of media content.

9. The apparatus of claim 6, further comprising a transmitter to transmit one or more electronic signals to the electronic communication network.

10. The apparatus of claim 6, the processor to model a relationship between the users, the plurality of items of content, and the content semantics.

11. The apparatus of claim 6, the factorization to be applied with respect to a set of latent interests to represent interactions between the users, the plurality of items of content, and the content semantics.

12. An article, comprising:
a non-transitory storage medium comprising machine-readable instructions executable by a special purpose apparatus to:
generate a user behavior cube at least in response to a determination of one or more latent interests for content to be based at least in part on joint processing of the user interest and content semantics to summarize a particular item of content of a plurality of items of the content as one or more topics to be based, at least in part on a combination of the user interest and the content semantics, wherein the content semantics to at least partially utilize a relationship between the particular item of content and co-occurrence of keywords in the plurality of items of content, and user interest for the particular item of content, wherein the user interest for the particular item of content is to be determined based, at least in part, on an estimated selection rate of the particular item of content, the estimated selection rate to be based, at least in part, on a freshness factorization feature of the particular item of content;
factorize the user behavior cube with respect to a combination of latent interests of the users and the content semantics to determine a correlation between at least the users and the plurality of items of content;
generate a content recommendation for a particular user based at least in part on the determined correlation and a user profile for the particular user, the user profile to indicate one or more particular interests for the particular user; and
initiate transmission of one or more electronic signals via an electronic communication network to a computing device, the one or more electronic signals to comprise the content recommendation.

13. The article of claim 12, the content recommendation to comprise a link to one or more items of media content.

14. The article of claim 12, wherein the machine-readable instructions are further executable to generate the content recommendation in response to a determination of the user profile for the particular user.

15. The article of claim 12, wherein the machine-readable instructions are further executable to generate the user behavior cube to model a relationship between users, the plurality of items of content, and the content semantics.

16. The article of claim 12, wherein the latent interests to represent interactions between users, the plurality of items of content, and the content semantics.

* * * * *